UNITED STATES PATENT OFFICE.

ALFRED M. SANDIG, OF CHICAGO, ILLINOIS.

COLORING PROCESS.

1,067,198. Specification of Letters Patent. Patented July 8, 1913.

No Drawing. Application filed April 2, 1912. Serial No. 688,083.

*To all whom it may concern:*

Be it known that I, ALFRED M. SANDIG, a citizen of the United States, residing at Chicago, in the county of Cook and State of Illinois, have invented a certain new and useful Improvement in Coloring Processes, of which the following is a full, clear, concise, and exact description.

My invention relates to coloring processes and has for its object the provision of an improved process for coloring which is of special utility in coloring photographic illustrations.

I have found my process of exceptional advantage in connection with the coloring of photographs when such photographs are printed either upon paper, films, or plates, and I will describe my invention herein specifically in connection with such coloring of photographs, although its application more broadly than specifically set forth herein will be readily apparent to those skilled in the art.

A photograph comprises two main parts or elements: first, the emulsion or photographic layer proper which carries incorporated therewith the developed photographic image; and second, the mechanical support or backing for the emulsion, such backing consisting of any suitable material such as glass, celluloid, paper, etc. The photographic layer or emulsion layer consists largely of gelatin as a rule, or of some other suitable material permeable to aqueous solutions, with which metallic salts sensitive to light have been emulsified and spread on a backing to give a sensitized plate, film or paper on which, after exposure to light, the image is developed and fixed. Permeability suitable material permeable to aqueous solutions is of course a necessary property with the ordinary methods of developing and fixing photographs. The support or backing of the photograph on the other hand may or may not be permeable. Backings of glass, celluloid or similar materials are of course substantially impermeable to most liquids, while a paper backing is more or less permeable.

The present invention has to do with a novel method of treating the photographic layer proper after the photograph or mixture has been produced. The new process is not concerned particularly with the mechanical support or backing upon which the photographic layer is carried, the nature of such support, whether of glass, celluloid or paper, being more or less immaterial for my purposes.

One essential object in the coloring of photographs is to so color the photographic layers that the color will be fast and will not fade or rather deteriorate due to the lapse of time. It is, for instance, of very great advantage to have a fast color when colored photographic films are used in display machines as these films are subjected to a strong light and the coloring matter is thus very liable to be attacked.

A further highly advantageous result obtained in the present process is a toughening of the photographic or emulsion layer due to the action of the dye upon it. This is of particular importance with kinetoscope films employed in display machines above mentioned, where the films are repeatedly reeled upon and unrolled from suitable carriers, such as spools, in the operation of passing the film before the projecting lantern. In films of this type, the emulsion layer is of course subjected to bending stresses and to more or less abrasion. The toughening effect produced by the present process is therefore highly important in rendering the emulsion layer tough and resistant.

In accordance with my improved process, photographic layers carried on films for instance may be colored and the resultant colored picture will have a fast coloring so that no deterioration need take place even under the strongest sunlight. Similar advantages, of course, are found when plates are used and the same advantage obtains in connection with photographs or illustrations on paper.

In accordance with my invention I utilize vat dyes (or similar coal tar derivatives), that is certain dyes which are changed from their vat color to some other color by subsequent action as by oxidation, for instance.

It is to be noted that the object of the process is to treat the photographic layer or emulsion layer as distinguished from the support or backing; and with impermeable backings such as glass plates and films of celluloid or the like, the effects of the dye are limited to the photographic layer only. With backings of paper or the like, such impregnation of the support by the dye as may occur is merely incidental to the process.

In order to render my invention and its broad application readily apparent to those skilled in the art. I will now describe specifically one specific embodiment of my new process which will accomplish the result desired, my invention of course contemplating equivalent processes as is well understood. In accordance with this one form of my improved process, I dissolve the vat dye (Ciba blue 2B for instance in a suitable hydrosulfite and caustic soda solution. To form this solution I dissolve say twenty grams of solid commercial caustic soda in five hundred grams of hot water. I then add one hundred grams of powdered commercial hydrosulfite and stir well. I then add one hundred grams of suitable dye, Ciba blue 2B aforesaid for instance, (more or less according to the desired shade). I then allow this solution to stand until whatever sediment and precipitate there is settles and falls to the bottom. I then draw off the solution which in this case would have a yellow color and it is ready for use. I then immerse the plate, film, or paper having the illustration in this solution for, say fifteen or twenty minutes, until it reaches the desired shade. Then if the illustration be on paper I thoroughly rinse this paper in cold water and dry it. In the case of films or plates, I find that a very short rinsing is sufficient, after which the plates or films are hung up or stood up to dry. After the films, plates, or paper have been in the atmosphere a suitable length of time, then the color changes. For instance then, if Ciba blue 2B were used which produced a yellow solution in the vat, the materials on which this solution acted would turn into a blue color after exposure to the atmosphere. This change of color may occur even during the rinsing process. It will be readily understood, of course, that the main desideratum as to the choice of the dye, of course, resides in the selection of such a dye which oxidizes very readily, or changes its color readily after removal from the solution. It may be pointed out that colors may be blended so as to secure the desired shades without departing from the spirit of my invention herein. Materials thus colored in accordance with the steps outlined above are colored in such a way that the color is fast so that they will not fade. Likewise the colored specimen does not lose its color by repeated washing or immersion, and the emulsion or photographic layer is rendered tougher and more resistant to abrasion, etc.

From what has been described the process of my invention will be readily apparent to those skilled in the art. As before stated, however, my invention is not limited to the specific details outlined herein, but is otherwise applicable.

Having, however, thus described one specific form in which the process may be applied, what I claim as new and desire to secure by Letters Patent is:

1. The process of treating photographs which comprises impregnating a permeable film or layer carrying an incorporated photographic image with a vat dye, and then developing the dye color.

2. The process of treating photographs which comprises immersing a photograph in a solution of a vat dye until the dye has penetrated into the film or layer with which the photographic image is incorporated, and oxidizing to develop the dye color.

3. The process of treating photographs which comprises treating a permeable carrier having incorporated therewith a photographic image with a vat dye and then developing the dye color in the carrier thus treated.

4. The process of treating photographs which comprises immersing a photograph in an alkaline solution of a vat dye, removing the photograph, and treating the same to develop the desired color.

5. The process of treating photographs which comprises impregnating the emulsion layer of a photograph with a solution comprising a readily oxidizable vat dye, an alkali and a hydrosulfite, rinsing the photograph, and developing the dye color by an oxidizing treatment.

In witness whereof, I hereunto subscribe my name this 22nd day of March, A. D., 1912.

ALFRED M. SANDIG.

Witnesses:
 HAZEL JONES,
 A. LYDA JONES.